United States Patent [19]
Lambregts et al.

[11] 4,357,661
[45] Nov. 2, 1982

[54] AIRCRAFT LANDING CONTROL SYSTEM

[75] Inventors: Antonius A. Lambregts, Renton; Rolf Hansen, Bellevue, both of Wash.

[73] Assignee: The Boeing Company, Seattle, Wash.

[21] Appl. No.: 123,529

[22] Filed: Feb. 22, 1980

[51] Int. Cl.³ .................. G05D 1/12; G06G 7/70; B64C 13/18

[52] U.S. Cl. .................. 364/430; 244/183; 244/187

[58] Field of Search .............. 364/428, 429, 430; 244/183, 185, 186, 187

[56] References Cited

U.S. PATENT DOCUMENTS

| | | | |
|---|---|---|---|
| 3,169,730 | 2/1965 | Gaylor et al. | 244/187 |
| 3,309,707 | 3/1967 | Tatz et al. | 244/187 X |
| 3,523,663 | 8/1970 | Doniger et al. | 244/187 |
| 3,523,664 | 8/1970 | Doniger et al. | 244/187 |
| 3,545,703 | 12/1970 | Montvale | 364/430 X |
| 3,578,269 | 5/1971 | Kramer et al. | 244/187 |
| 3,665,465 | 5/1972 | Miller | 244/188 X |
| 3,666,929 | 5/1972 | Menn | 364/428 |
| 3,705,306 | 12/1972 | Lydon et al. | 364/430 |
| 4,141,522 | 2/1979 | Lambregts | 364/429 X |

Primary Examiner—Felix D. Gruber
Attorney, Agent, or Firm—James P. Hamley; Bernard A. Donahue

[57] ABSTRACT

Upon aircraft landing approach, flare path command signals of altitude, vertical velocity and vertical acceleration are generated as functions of aircraft position and velocity with respect to the ground. The command signals are compared with corresponding actual values to generate error signals which are used to control the flight path.

8 Claims, 7 Drawing Figures

4,357,661

AIRCRAFT LANDING CONTROL SYSTEM

BACKGROUND OF THE INVENTION

The invention described herein was made in the performance of work under a NASA contract No. NAS1-14880 and is subject to the provisions of Section 305 of the National Aeronautics and Space Act of 1948, Public Law 85-568 (72 Stat. 435; 42 USC 2457).

The present invention pertains to the aircraft guidance art and, more particularly, to a system for controlling aircraft flight during landing flare.

A critical portion of aircraft landing trajectory is commonly known as flare out or flare. Flare is that portion of the landing trajectory between the fixed angle glide slope and aircraft runway touchdown. Thus, it is desirable, particularly for commercial aircraft, that the flare profile depart smoothly from the fixed angle glide slope approach providing a smooth transition to runway taxiing.

In commercial aircraft, attempts have been made at generating landing flare commands to be used either as a director to the pilot or for automatic, i.e. autopilot landing. One such system commands a linear decrease of sink rate as a function of altitude above the runway. Thus, the sink rate is of the form: $\dot{h}_c(h) = k_h h + k_{BIAS}$, where $\dot{h}(h)$ is aircraft sink rate, and k and $k_{BIAS}$ are defined constants.

The fundamental problem with this system, however, is that ground speed affects touchdown dispersion. That is, since aircraft ground speed is not taken into account, the actual touchdown point of the aircraft on the runway can vary considerably depending on the ground speed. This is undesirable both for safety reasons and because reduced touchdown dispersion is essential to effective runway utilization and continued aircraft operation under adverse weather conditions.

In addition, the prior system is subject to large touchdown dispersion due to its sensitivity to sink rate signal errors.

Further, the prior art flare command system had narrow control flexibility, e.g. bandwidth and gain selection, thereby limiting its accuracy and adaptability.

SUMMARY OF THE INVENTION

It is an object of this invention, therefore, to provide an improved aircraft flare command system which may be used to reduce touchdown dispersion.

It is a further object of the invention to provide the above described improved aircraft flare command system which is not dependent on a single sensed aircraft paramater.

It is an additional object of the invention to provide the above described aircraft flare command system, which is flexible in design, allowing extreme accuracy and adaptability.

Briefly, according to the invention, apparatus for generating flare path control signals for an aircraft includes a means which produces a ground position signal, x, corresponding to the position of the aircraft with respect to a reference point on the runway. A signal, $V_G$, is produced corresponding to aircraft ground speed. A command generating means monitors the ground position signal and the ground speed signal and produces in response thereto, and as a predetermined function of said signals, a sequence of three command signals. The first signal, $h_c$, is the altitude command signal, defined uniquely as a function of ground position. The second is a vertical velocity command signal $\dot{h}_c$. The final command signal is a vertical acceleration signal, $\ddot{h}_c$. The $\dot{h}_c$ and $\ddot{h}_c$ command signals are defined as a function of both ground position and ground speed in proper relationship to the altitude command signal.

Preferably, the command signals $h_c$, $\dot{h}_c$ and $\ddot{h}_c$ may be generated via either disclosed differentiating or integrating methods or using exponential functions.

DETAILED DESCRIPTION OF THE PREFERRED EMBODIMENTS OF THE INVENTION

Figure 1:
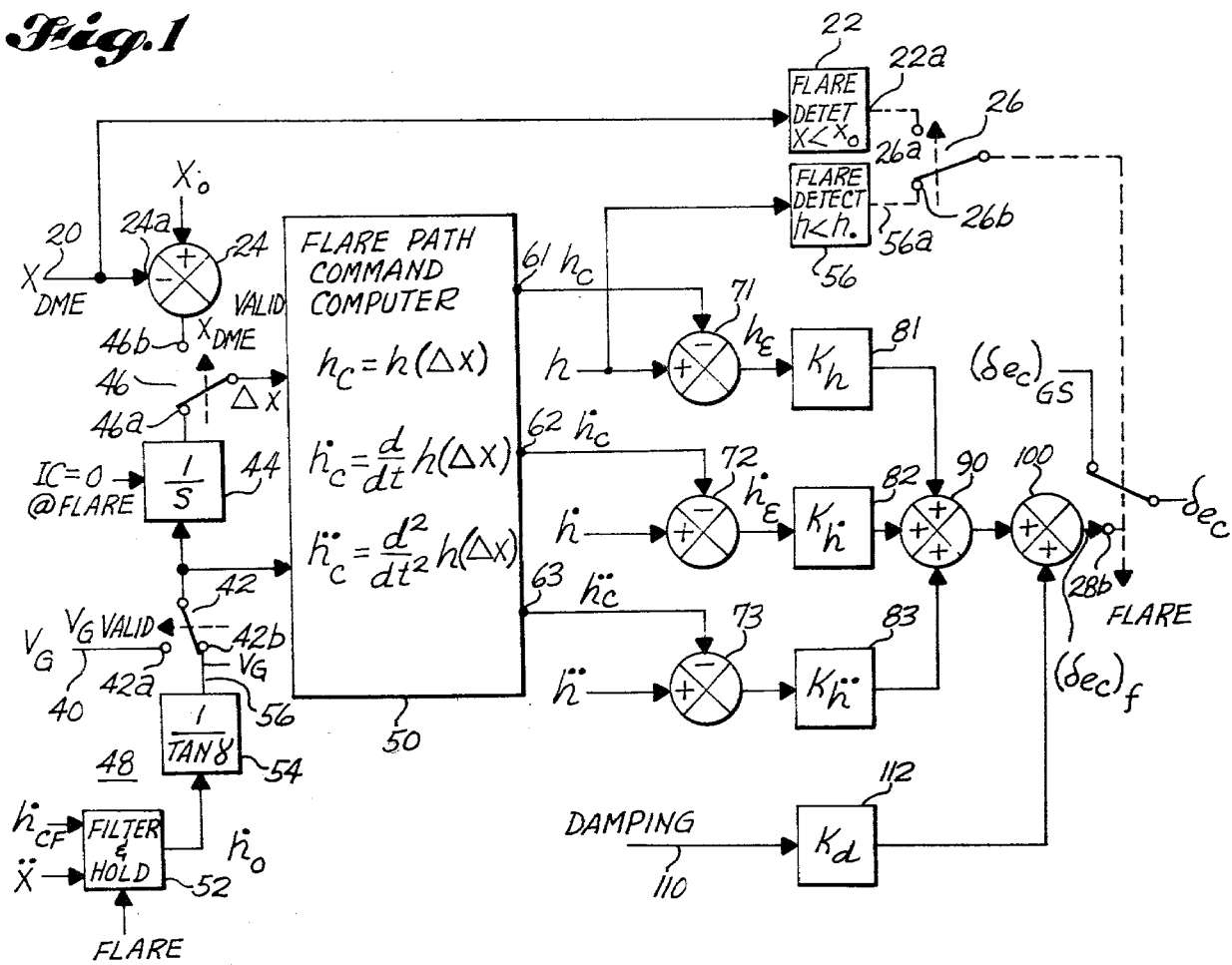
FIG. 1 is a generalized block diagram illustrating the preferred embodiment of the flare out command system.

FIG. 1 is a block diagram illustrating the topology of the instant flare path control system. Operation of the system is better understood with reference to FIG. 2 which illustrates an airplane 10 on its landing descent to a runway 12. During the landing maneuver, the aircraft normally approaches the runway on a glide slope 14 which is defined by a fixed angle, commonly three degrees, with respect to the runway. At an altitude $h_o$ the airplane begins its flare-out, indicated by reference numeral 16. The purpose of the flare is to provide a smooth controlled landing. The airplane position relative to the runway at which flare is initiated is defined as $x_o$. For the example of FIG. 2, the commanded flare path intersects the runway 1460 feet from the $x_o$ location. Deviations from this 1460 foot touchdown point are referred to as dispersion. In the prior art automatic flare-out control systems, the dispersion was quite large due to the effect of variation in ground speed, from one approach to another.

Thus, to minimize dispersion, the present automatic flare-out control system, as shown in FIG. 1, utilizes both ground position and ground speed as a basis for generating its control signals.

In many cases, aircraft distance relative to a point on the runway can be obtained from distance measuring equipment (DME) which produces a signal $x_{DME}$ corresponding to the position of the aircraft with respect to a fixed point on the ground. Where the $x_{DME}$ signal is available, it is received at the instant system at an input line 20 and routed both to a flare detect box 22 and to the negative input 24a of a summer 24.

Block 22 monitors the aircraft's position signal and, when it is less than a signal $x_o$ corresponding to the desired distance to initiate flare, an output is provided on its output line 22a. When a standard aircraft system, not shown, determines that the distance measuring equipment is operating properly, a switch 26 is activated to its position 26a thereby routing the flare detect output signal to operate a second switch 28. During the landing approach maneuver, switch 28 is in its position 28a whereby it routes an elevator command signal $(\delta_{ec})_{gs}$ to the aircraft's elevators. The signal $(\delta_{ec})_{gs}$ represents the elevator command signal for glide slope control and is provided by circuitry (not shown) commonly found in modern aircraft.

When the aircraft has reached the flare initiation position $x_o$, the flare detect block 22 flips switch 28 to its second state 28b. In this state, the output command signal to the aircraft's elevators is provided by the flare path command circuitry.

In some caes, a distance measuring equipment signal $x_{DME}$ is not available. However, a valid ground speed signal $V_G$ may be available, as provided, for example, by an inertial reference system. In this event, the ground speed signal $V_G$ is input on a line 40. This signal is routed by a switch 42 in its position 42a as one input to the flare path command computer 50. Also, the signal is integrated in an integrator 44, which has an initial condition of zero at flare initiation, thereby producing a relative ground distance signal $\Delta x$ which is passed via a switch 46, in its position 46a, also to an input of the flare path command computer. Switch 46 assumes its position 46b in the event that the distance measuring equipment signal is valid.

Finally, if neither a distance measuring equipment signal $x_{DME}$ nor a ground speed signal $V_G$ is available, a ground speed signal can be determined by the circuitry indicated generally at 48. Here, the vertical velocity signal $h_{CF}$, which has been complementary filtered, and the output signal from a horizontal accelerometer $\ddot{x}$ are both input to a filter and hold circuit 52 to produce a vertical sink rate signal $\dot{h}_o$. At flare initiation, the calculated value of sink rate $\dot{h}_o$ is held by the circuit 52 and multiplied, in block 54, by the inverse tangent of the aircraft's flight path angle $\gamma$. This results in a calculated value of ground speed $V_G$ appearing at the output line 56 of block 54. Thus, when the aircraft is not provided with a valid ground speed signal $V_G$ as from an inertial reference system, the switch 42 is in its position 42b whereby the calculated value of ground speed is routed both directly to the flare path command computer and through the integrator, thereby producing the relative ground position signal $\Delta x$, which is also routed to the flare path computer.

In addition, for the condition wherein the distance measuring equipment signal $x_{DME}$ is not available, or is detected as not being valid, switch 26 switches to its position 26b. Here, the initiation of flare is sensed by determining that instant at which the aircraft's actual altitude h, as determined by an altimeter, is less than the flare initiation altitude $h_o$. This is done by a block 56 which then produces an output signal on its line 56a which is routed to switch 28 thereby switching the system from its glide slope command to the flare-out command.

The flare path command computer 50 processes the position signal $\Delta x$ and ground speed signal $V_G$, thereby producing commanded altitude, vertical velocity, and vertical acceleration signals $h_c$, $\dot{h}_c$ and $\ddot{h}_c$, respectively. Described below are three methods, namely differentiation, integration and exponential function, for generating the command signals.

DIFFERENTIATION TECHNIQUE

Figure 2:
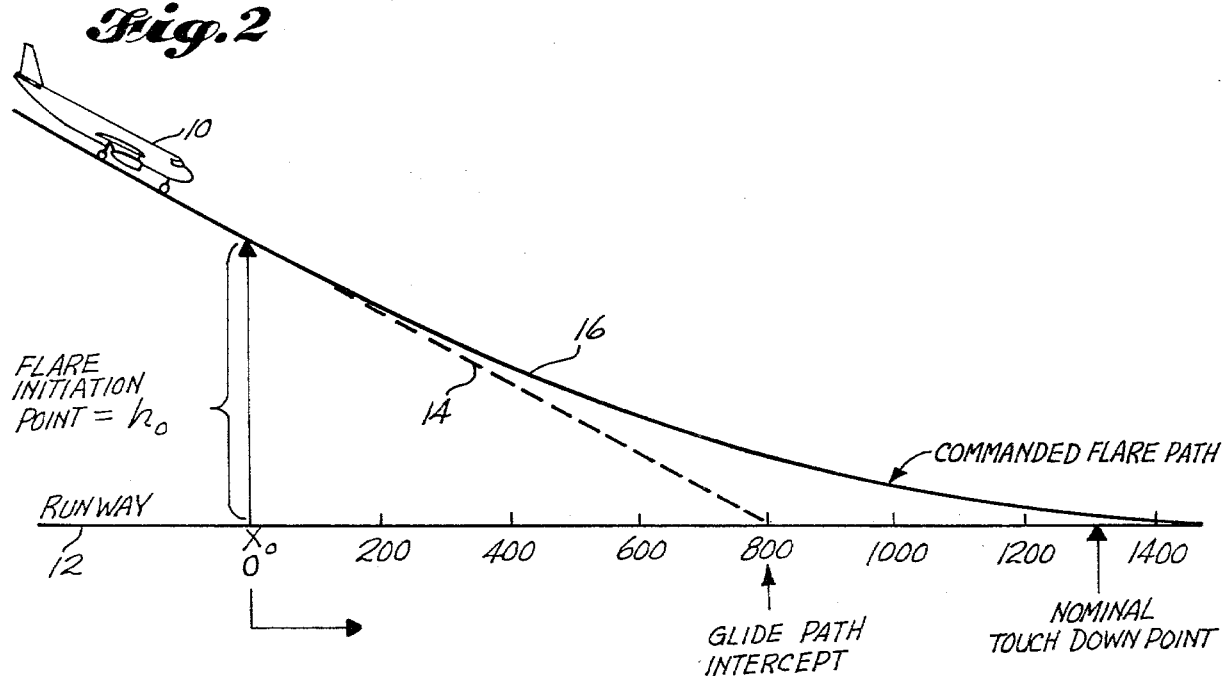
FIG. 2 is a graph illustrating aircraft landing trajectory.

In this approach, the function $h_c = h(\Delta x)$ is selected in accordance with the constraints of a given condition. Thus, the function may be selected such that the flare path slope is continuous with the glide slope at the start of flare and then smoothly reduces to the desired slope at the touchdown point, yielding a desired sink rate as, for example 2.5 feet per second as shown in FIG. 2.

Once the function $h_c = h(\Delta x)$ is defined, the flare path command computer may use either approximating functions or a look-up table to generate the altitude command signal $h_c$ for a given ground position signal $\Delta x$.

Now, the sink rate command signal may be determined from the equation $$\dot{h}_c = \frac{d\,h(\Delta x)}{dt}$$

But since $h(\Delta x)$ is solely a function of $\Delta x$, this expression becomes:

$$\dot{h}_c = (d/dx)h(\Delta x)(dx/dt)$$

But, by definition $dx/dt = V_G$. Thus, ground speed $V_G$ enters into the sink rate command computation:

$$\dot{h}_c = V_g(d/dx)h(\Delta x)$$

The commanded vertical velocity $\dot{h}_c$ may be calculated by taking the derivative of $h(\Delta x)$ with respect to ground distance and multiplying this by the input value of ground speed $V_G$. This is done by the flare path command computer 50 using modern computer techniques. As such, a detailed analysis of the computation will not be given here.

Finally, the vertical acceleration command signal $\ddot{h}_c$ is given by $$\ddot{h}_c = (d^2/dt^2)\,h(\Delta x).$$

But, from the above relationship for vertical velocity this becomes $$\ddot{h}_c = \frac{d}{dt}\left(V_G \frac{d}{dx}\,h(\Delta x)\right)$$

and, finally, $$\ddot{h}_c = V_G^2(d^2/dx^2)h(\Delta x) + (\dot{V}_g/V_g)\dot{h}_c$$

The term $\dot{V}_G/V_G\,\dot{h}_c$ is negligibly small and may be ignored. Therefore, the longitudinal acceleration signal $\dot{V}_G$ is not required to compute vertical acceleration command $\ddot{h}_c$. Thus, given that $h_c = h(\Delta x)$ is defined, the corresponding vertical velocity $\dot{h}_c$ and vertical acceleration $\ddot{h}_c$ can be computed by the flare path command computer 50 using standard differentiation techniques.

The flare path command signals $h_c$, $\dot{h}_c$ and $\ddot{h}_c$ are routed via flare path command computer output lines 61–63, respectively to the negative input of summer circuits 71–73 respectively. Applied to the positive inputs of summer circuit 71–73 are sensor signals h, $\dot{h}$ and $\ddot{h}$ corresponding to the aircraft's actual altitude, vertical velocity and vertical acceleration, respectively. Thus, the summer circuits 71–73 produce at their outputs error signals $h_\epsilon$, $\dot{h}_\epsilon$ and $\ddot{h}_\epsilon$ corresponding to the error difference between the actual aircraft state and their corresponding commanded states. These signals are multiplied by suitable gain factors $k_h$, $\dot{k}_h$ and $\ddot{k}_h$ in gain blocks 81–83, respectively. They are then all combined in a summer 90 producing a composite error signal. The gain factors $k_h$, $\dot{k}_h$ and $\ddot{k}_h$ do not determine the flare path but, rather, the magnitude of the elevator control with which the aircraft is directed to the desired path. Thus, the instant system allows a convenient means for optimizing gains for the sole purpose of providing optimum path tracking and therefrom minimum touch down dispersion.

The summer 100 combines the composite error signal with a damping signal. Damping signals are ordinarily provided in aircraft avionics, normally as a function of pitch rate, and will not be more fully described here. This damping signal is routed over a line 110 to a gain block 112 having a gain factor $k_d$. The gain factor $k_d$ is selected in accordance with the constraints and requirements of a given system. The resulting damping signal is passed to the summer 100 where it is summed with the composite error signal thereby producing the control signal, $(\delta_{ec})_f$ which, as described above, is routed to the aircraft's elevator controls during a flare maneuver. Thus, once flare begins, the aircraft's path begins to curve, and as a result of $\ddot{h}_c$, an $\ddot{h}_\epsilon$ is produced and thus a corresponding elevator command. The aircraft will then rotate before a significant $\dot{h}_\epsilon$ and $h_\epsilon$ error develop and will therefore track the command flare path closely.

INTEGRATION TECHNIQUE

As described above, the flare path command computer 50 of FIG. 1 may utilize differentiation to derive the vertical velocity and vertical acceleration commands given the functional relationship between command altitude and relative ground position. Alternatively, integration techniques may be utilized to derive the same command signals. This may be understood as follows.

As derived above, the desired vertical acceleration command signal is expressed $$\ddot{h}_c = V_G^2(d^2/dx^2)h(\Delta x) + (\dot{V}_G/V_G)\dot{h}_c.$$

Thus, rather than preselecting the function $h_c = h(\Delta x)$ as with a differentiation technique, it is possible to preselect the function $d^2h(\Delta x)/dx^2$. A requirement for this function is that it equal zero at $\Delta x = 0$ in order to realize a smooth transition from a linear glide slope to a curved flare path. A further requirement may be to limit the magnitude of this function at touchdown. The higher this magnitude at touchdown, the more the curvature of the flare trajectory occurs at low altitudes and therefore the higher the risk of landing with a high sink rate due to deviations from the commanded flare trajectory. Also, the more the flare trajectory curvature occurs at low altitude, the lower the final sink rate must be to touchdown at a preselected point on the runway. This, then, adversely effects the touchdown dispersion.

The pitch attitude at touchdown is roughly proportional to the vertical acceleration. It is desirable that pitch attitude increase steadily during flare. This can be done by shaping the $d^2h(\Delta x)/dx^2$ function such that it builds up smoothly and then maintains a relatively steady value until touchdown. The aircraft speed bleed-off also helps to provide an increasing pitch attitude as flare progresses.

With the $d^2h(\Delta x)/dx^2$ function defined, the various commands may be determined as is explained below.

Figure 3:
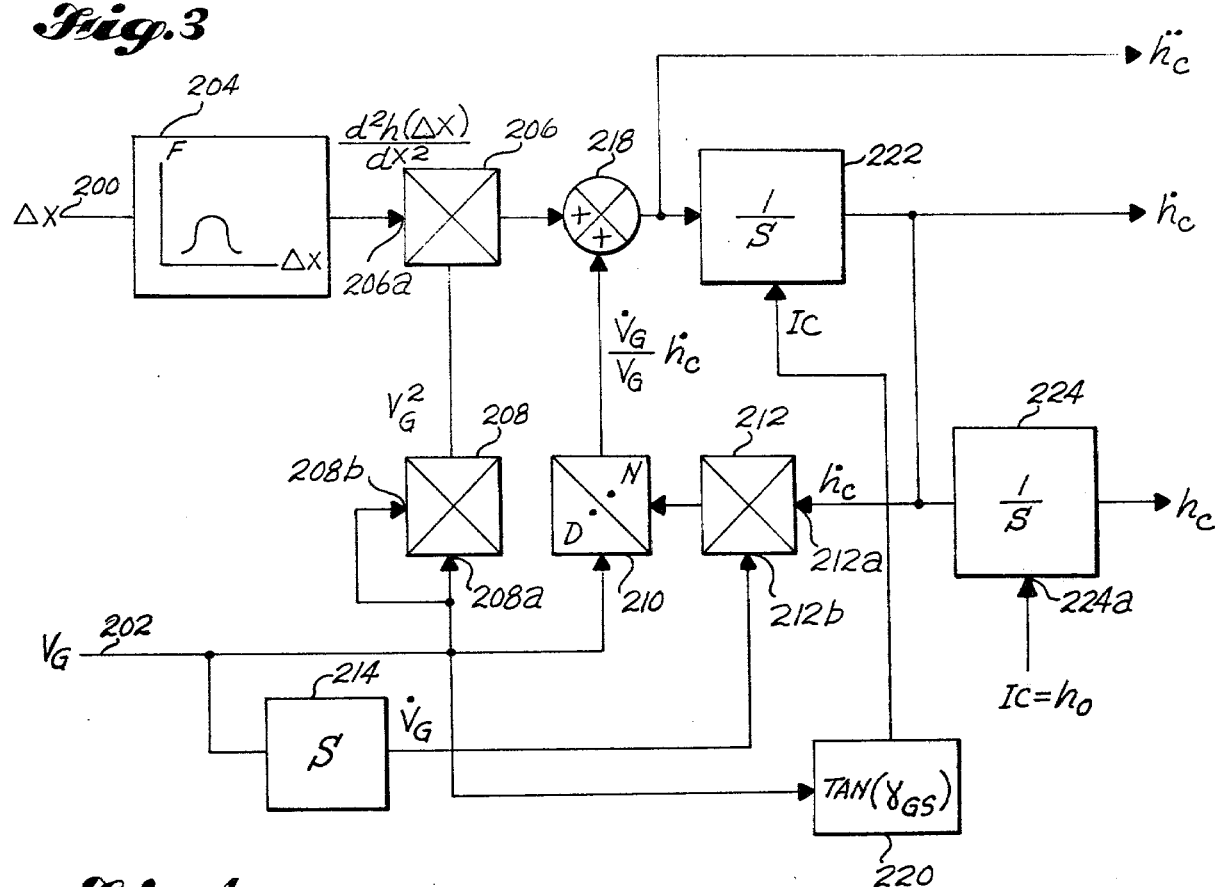
FIG. 3 is a block diagram illustrating the preferred embodiment of the flare path command signal generating apparatus utilizing integration techniques.

FIG. 3 is a detailed block diagram illustrating the preferred construction of the flare path command computer 50 shown in FIG. 1 wherein integration techniques are used to generate the command signals. As before, the system receives an input as to relative position of the aircraft, $\Delta x$, on an input line 200 and aircraft ground speed $V_G$ on input line 202. These parameters are determined as is discussed with respect to FIG. 1.

The relative position signal $\Delta x$ is fed to a block 204 which produces an output signal $F(\Delta x)$. In this case, $$F(\Delta x) = (d^2/dx^2)h(\Delta x).$$

The functional relationship between the second derivative of relative position and the relative position itself may be provided via a standard memory look-up table or via computation of an analytical function. For one application of the invention, the following approximating functions were used:

$$F(\Delta x) = 1 + \cos(0.0062\Delta x - \pi) \text{ for } 0 < \Delta x < 844 \text{ ft.}$$

$$= 1 + \cos[0.00165(\Delta x - 844) + 1.92] \text{ for } 844 \text{ ft.} < \Delta x < 1583 \text{ ft.}$$

Thus, the preselected value of $d^2h(\Delta x)/dx^2$ is passed to the first input 206a of a multiplying block 206. Applied to the second input of 206b of the multiplying block 206 is a signal corresponding to ground speed squared, $V_G^2$. This signal is generated by taking the input ground speed signal $V_G$ on line 202 and passing it to both inputs 208a and 208b of a multiplier 208. Thus, the output from multiplier block 206 is the first term of the equation for commanded vertical acceleration $\ddot{h}_c$ given above. The second term is generated by passing the ground speed signal $V_G$ on line 202 to a divider circuit 210. Divider circuit 210 has, as its numerator input the output of multiplier 212. Multiplier 212 has at its first input 212a the commanded vertical velocity signal $\dot{h}_c$, which is produced in a manner discussed below. At the remaining input 212b of multiplier 212 is $\dot{V}_G$, the first derivative with respect to time of ground speed which is obtained by passing the ground speed signal $V_G$ through the differentiating block 214. Thus, the output from multiplier 212 is of the form $\dot{V}_G\dot{h}_c$. When this is divided by ground speed $V_G$, the output from divider block 210 is, thus, $(\dot{V}_G\dot{h}_c/V_G)$. As mentioned above, although this term is small and is not important compared to the main term of the $\ddot{h}_c$ definition, it cannot be neglected in this system. The reason for this is that omission of this term causes a more serious error in the computation of $\ddot{h}_c$ as a result of the integration process with time. Likewise, the resulting error in the $\dot{h}_c$ computation becomes even greater due to the dual integrations if this term is omitted. The result of omitting this term is that commanded flare trajectory would no longer intercept the runway at a fixed point thus resulting in increased touchdown dispersion.

Hence, a summer 218 is used to sum the first and second terms of the vertical acceleration $\ddot{h}_c$ equation.

Given the vertical acceleration signal, the sink rate command, or vertical velocity command is then simply given as $$h_c = h_{t=o} + \int_o^t \dot{h}_c \, dt.$$

In this formula, $\dot{h}_{t=o} = V_G \tan \gamma_{GS}$, where $\gamma_{GS}$ is the glide slope guidance flight path angle, is the initial condition for the integration. Referring then to FIG. 3, the ground speed signal on line 202 is multiplied by tangent $\gamma_{GS}$ in block 220 the output of which provides the initial condition (IC) to an integrator 222. The input to integrator 222 is the commanded vertical acceleration signal $\ddot{h}_c$. Thus, the output from the integrator 222 is seen to be the desired vertical velocity command signal $\dot{h}_c$.

Finally, the altitude command becomes $$h_c = h_{ct=o} + \int_o^t \dot{h}_c \, dt,$$

where $h_{ct=o}$ is either the aircraft's altitude at flare initiation when flare initiation is triggered by altitude or it is the glide slope altitude at the flare initiation point when flare initiation is triggered by the DME signal. Thus, the command altitude $h_c$ is determined by integrating the vertical velocity command signal $\dot{h}_c$ in integrator 224 which has the aforementioned initial condition $h_{ct=o}$ applied at input 224a.

A certain difficulty arises with the requirements of achieving both the desired sink rate and distance at touchdown. To obtain the desired touchdown sink rate, given a certain ground speed, requires that the function $d^2h(\Delta x)/dx^2$ have a certain area under the curve. This area is a function of both the magnitude of $d^2h(\Delta x)/dx^2$ and the total flare distance. If the flare distance is to be increased without affecting the sink rate at touchdown, the $d^2h(\Delta x)/dx^2$ term curve must be reshaped to provide a higher level of vertical acceleration early in the flare and a lower level during the later part of flare. In this way, the flare path starts to curve upward sooner but the final slope stays the same, resulting in an increased distance but an unchanged sink rate at touchdown.

In summary, integration techniques may be used to generate the flare path command signals, starting with a predefined function $d^2h(\Delta x)/dx^2$ and using the input signal variables $\Delta x$ and $V_G$.

e-function Technique

Figure 4:
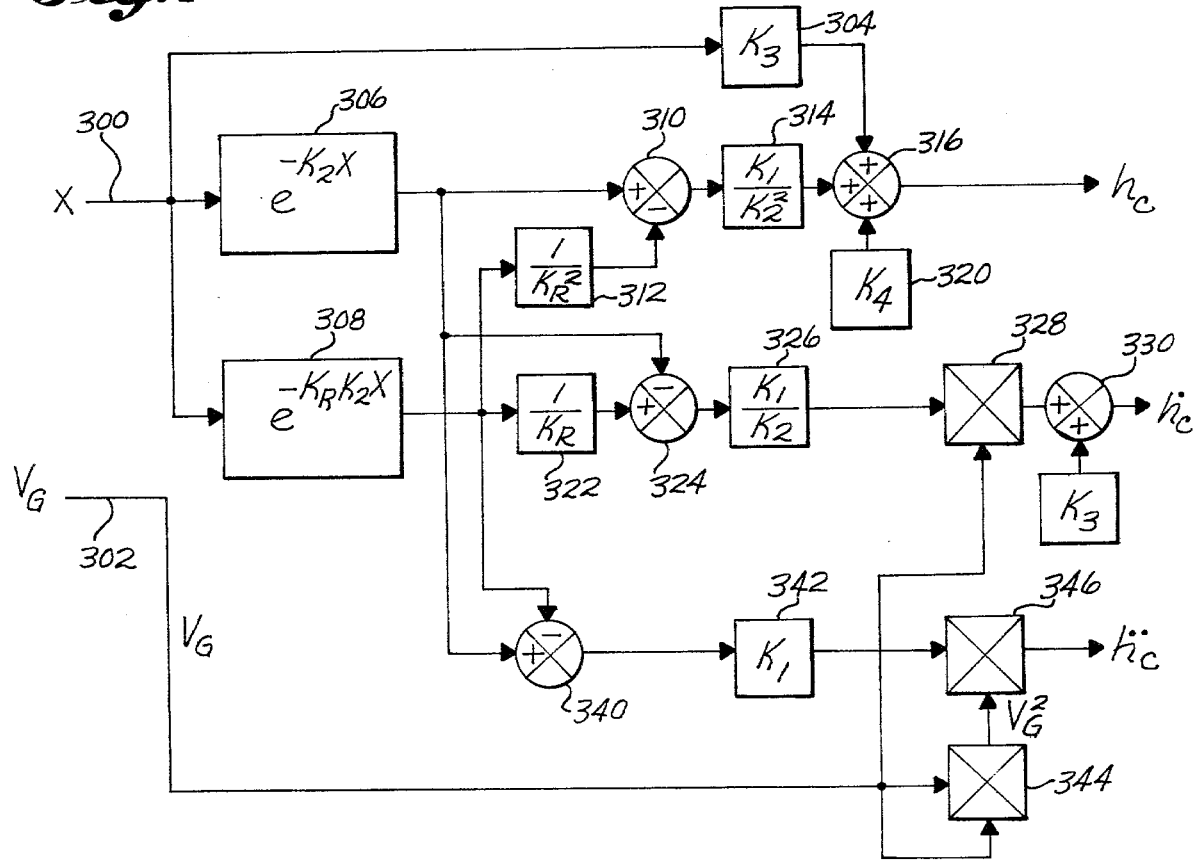
FIG. 4 is a block diagram illustrating the preferred embodiment of the flare path command signal generating apparatus using exponential function techniques in a digital implementation.
Figure 5:
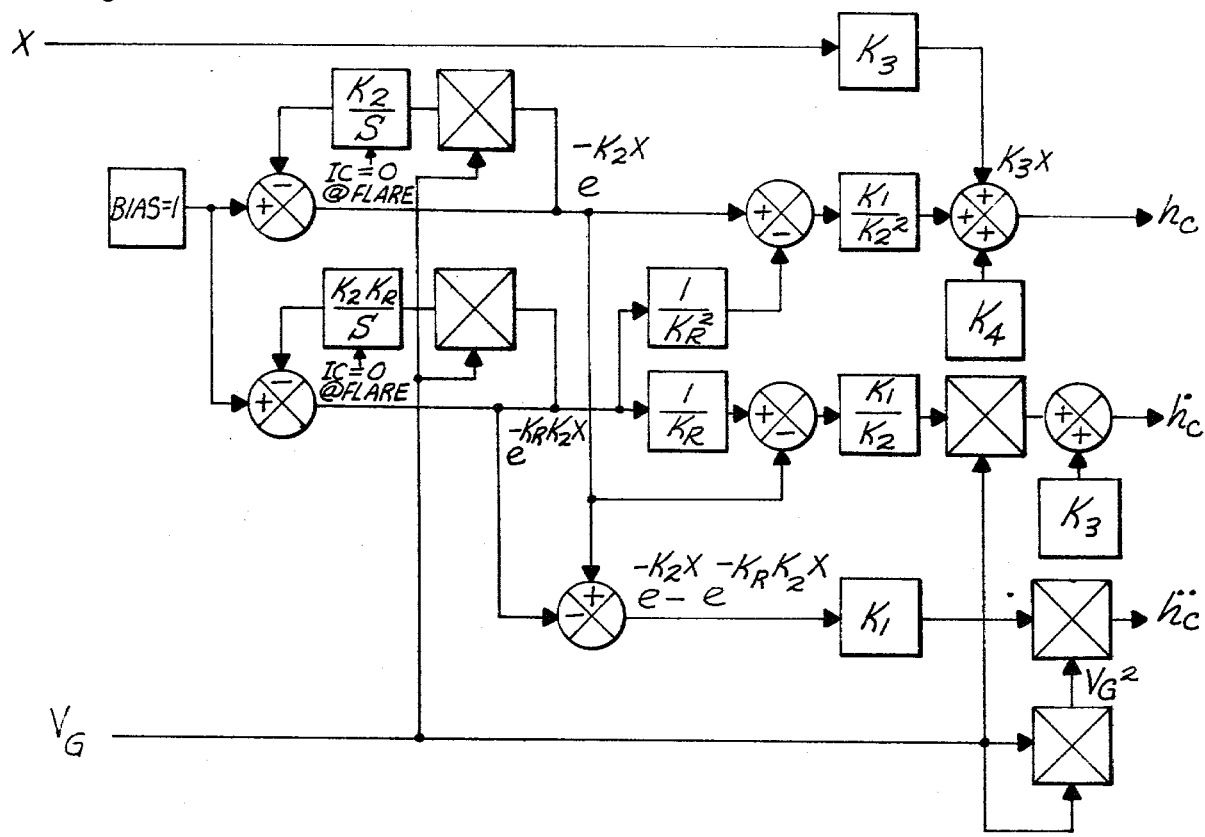
FIG. 5 is a block diagram illustrating the preferred embodiment of the flare path command signal generating apparatus using an analog implementation.

FIGS. 4 and 5 illustrate detailed block diagrams of preferred embodiments of the flare path command computer 50 of FIG. 1 wherein e-functions are used to determine the command signals. The use of e-functions is attractive since their derivatives are identical to the original function and the sink rate and vertical acceleration commands may thus be formed readily without imposing a significant additional computational burden. The system described is especially suitable for digital computers, as shown in FIG. 4, but may also be employed in analog flight control computer system, as shown in FIG. 5.

Referring to FIG. 2, the desired altitude command signal as a function of distance x along the runway as measured from the flare initiation point may be given as:

$$h_c = k_1[(e^{-k_2x}/k_2^2) - (e^{-k_3x}/k_3^2)] + k_4,$$

where $k_1$, $k_2$ and $k_4$ are all constants related to the desired flare path.

The matching sink rate command then follows:

$$\dot{h}_c = \frac{dh_c}{dt} = \frac{d}{dx} h_c \frac{dx}{dt}$$

$$= k_1 V_G \left[ \frac{-e^{-k_2x}}{k_2} + \frac{e^{-k_3x}}{k_3} \right]$$

Similarly, the matching vertical acceleration command becomes:

$$\ddot{h} = \frac{d^2}{dt^2} h_c$$

$$= \frac{d}{dt} \dot{h}_c$$

$$= V_G^2 k_1 [e^{-k_2x} - e^{-k_3x}] + \frac{\dot{V}_G}{V_G} \dot{h}_c.$$

From this it follows that $\ddot{h}_c = 0$ at flare initiation ($x=0$, $\dot{V}_G=0$). However, this flare path definition allows no direct control over the vertical acceleration rise time, since the four constants $k_1$–$k_4$ are determined by the four path constraints $h_{x=0}$, $\dot{h}_{x=0}$, $x_{h=0}$ and $\dot{h}_{h=0}$.

The vertical acceleration rise time is controlled by the relative values of $k_2$ and $k_3$ and the maximum vertical acceleration occurs for $$\ddot{x}_{hmax} = \left( \frac{1}{k_3 - k_2} \right) \ln \frac{k_3}{k_2}.$$

If, therefore, the relative values of $k_2$ and $k_3$ can be selected, the acceleration can be controlled to the desired rise time. This turns out to be possible by adding a term proportional to x to the flare path definition. Such a term does not contribute to the definition of the acceleration. The path definition then becomes:

$$h_c = (k_1/k_2^2)[e^{-k_2x} - (e^{-k_Rk_2x}] + k_3x + k_4$$

and $$\dot{h}_c = V_G(k_1/k_2)[-e^{-k_2x} + (e^{-k_Rk_2x}] + k_3$$

and $$\ddot{h}_c = V_G^2 k_1[e^{-k_x x} - e^{-k_Rk_2x}] + (\dot{V}_G/V_G)\dot{h}_c$$

In these equations the constants $k_1$–$k_4$ are determined by the four flare path constraints given above, whereas the constant $k_R$ is selected to yield the desired vertical acceleration rise time.

FIG. 4 is a detailed block diagram illustrating the preferred digital implementation of the flare path command computer utilizing the e-function technique. As before, the inputs to the computer are the relative position x of the aircraft with respect to the runway, provided on line 300 and the aircraft ground speed $V_G$ provided on line 302.

The altitude command signal $h_c$ is generated as follows. The aircraft position signal x on line 300 is routed to blocks 304, 306 and 308. The block 306 receives the signal x and computes the function $e^{-k_2x}$. The output from block 306 is applied to the positive input of the summer 310. The block 308 produces the signal $e^{-k_Rk_2x}$. This is passed to a block 312 which multiplies its input by $1/k_R^2$. The output from block 312 is coupled to the negative input of summer 310. The output of summer 310, when passed through the block 314 having the transfer $k_1/k_2^2$ thus becomes the first term of $h_c$ as given above. This is passed to one input of a summer 316.

The second term of the altitude command signal $h_c$ is easily computed by multiplying the signal x with a factor $k_3$ in block 304 before it is passed to the summer 316. Finally, the only remaining term is the added constant $k_4$ produced in block 320, and also passed to summer 316. Thus the output from 316 is the desired altitude command signal $h_c$.

The vertical velocity command signal $\dot{h}_c$ is generated by passing the output from block 308 through block 322, to apply the gain factor $1/k_R$, before it is passed to the positive input of a summer 324. Applied to the negative input of summer 324 is the output from block 306. The resulting signal output from summer 324 is multiplied by the constant $k_1/k_2$ in block 326 and then by the ground speed $V_G$ in multiplying block 328 to produce the principal term of commanded vertical velocity. The resulting signal out of block 328 may be added in summer 330 with the constant $k_3$ provided in block 332 to thereby produce the desired vertical velocity command signal $\dot{h}_c$.

Finally, the commanded vertical acceleration signal $\ddot{h}_c$ is generated by passing the output from block 306 to the positive input, and the output from block 308 to the negative input of a summer 340. This signal is multiplied in block 342 by the constant $k_1$ and multiplied by ground speed squared $V_G^2$ in multiplier 346. The $V_G^2$ signal is produced at the output of multiplier 344. The resulting output from multiplier 346 is the vertical acceleration signal, wherein the term $\dot{V}_G/V_G \dot{h}_c$ is neglected.

FIG. 5 illustrates the preferred analog implementation of the flare path command computer 50 of FIG. 1 for the e-function technique. Here, the e-functions are obtained using lag circuits in which the variable time constants are determined as follows:

$$x = V_G \cdot t$$

$$k_2 x = k_2 V_G \cdot t = t/\tau_1$$

$$k_R k_2 x = k_R k_2 V_G \cdot t = t/\tau_2$$

The time constants $$\tau_1 = 1/k_2 V_G$$

$$\tau_2 = 1/k_R k_2 V_G$$

are seen to be functions of $V_G$ and are implemented using multiplier circuits. Given the discussion above, one of ordinary skill in the art would have no trouble understanding the arrangement, or hardware implementation of the circuit topology given in FIG. 5. Thus, a detailed discussion of its operation will not be given here.

Figure 6:
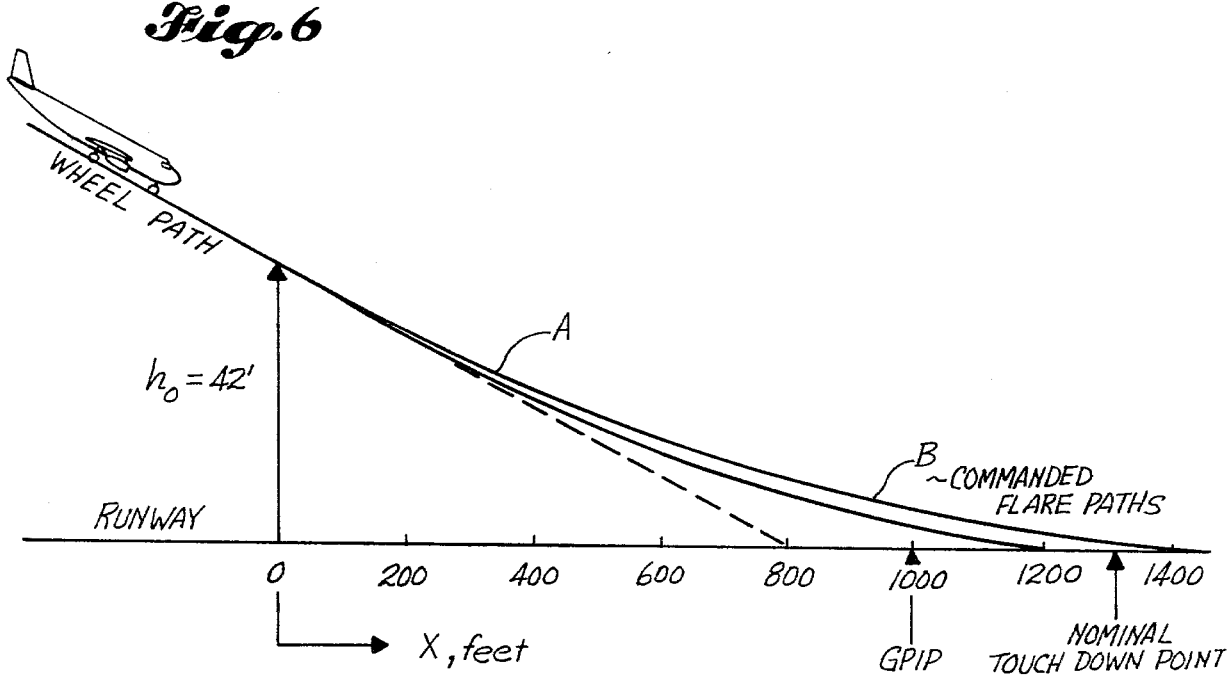
FIG. 6 is a graph illustrating the response characteristics of the system shown in FIGS. 4 and 5 for a given set of constants.
Figure 7:
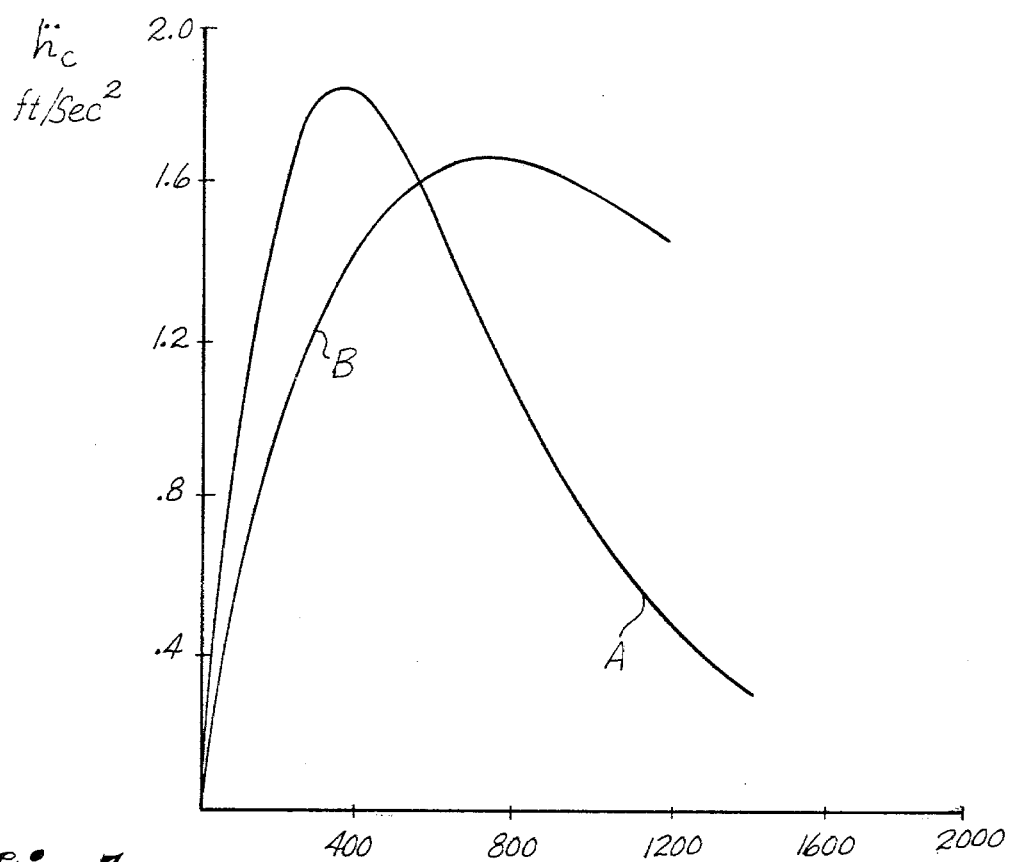
FIG. 7 is a graph illustrating the vertical acceleration commands for two different flare paths.

Sample flare trajectories and corresponding acceleration commands for a ground speed of 120 knots are illustrated in FIGS. 6 and 7. Here, the curves labeled A correspond to the following condition
$k_1 = 0.0001816455$
$k_2 = 0.00204795$
$k_3 = -0.0079918$
$k_4 = 9.51766$
$k_R = 2$
The curves labeled B correspond to
$k_1 = 0.0001645$
$k_2 = 0.00095$
$k_3 = 0.0342$
$k_4 = 94.68$
$k_R = 2$ These examples illustrate the variability of the flare trajectory and thereby the flare dynamics. The flare trajectory can thus be defined to obtain not only the desired touchdown conditions (sink rate and distance), but also to a large extent the time history of elevator and thereby pitch attitude and vertical acceleration. For example, the flare trajectory with a high vertical acceleration level at touchdown results in a higher pitch attitude at touchdown.

Thus, a system has been described for generating flare commands $h_c$, $\dot{h}_c$ and $\ddot{h}_c$ utilizing e-functions.

In summary, an aircraft landing control system has been described which utilizes either a differentiation or integration function of position on the ground. The instant system may be employed to reduce landing dispersion while allowing the designer broad control over system parameters.

While preferred embodiments of the invention have been described in detail, it should be apparent that many modifications and variations thereto are possible, all of which fall within the true spirit and scope of the invention.

We claim:

1. Apparatus for generating flare path control signals for an aircraft comprising:
   ground position means for producing a ground position signal, $\Delta x$, representative of the position of the aircraft relative to a fixed reference point on the ground;
   ground speed means for producing a ground speed signal representative of the ground speed of the aircraft;
   command means for processing said ground position signal and said ground speed signal in a predetermined manner to produce:
   (a) an altitude command signal, $h_c$;
   (b) a vertical velocity command signal, $\dot{h}_c$; and
   (c) a vertical acceleration command signal, $\ddot{h}_c$, whereby said $h_c$ command signal defines the desired flare path of the aircraft and said $\dot{h}_c$ and $\ddot{h}_c$ command signals represent desired sink rate and vertical acceleration respectively, corresponding to said desired flare path;
   sensor means for producing signals h, $\dot{h}$ and $\ddot{h}$ representative of the aircraft's actual altitude relative to the runway, vertical velocity and vertical acceleration, respectively;
   subtracting means for subtracting each actual aircraft signal h, $\dot{h}$ and $\ddot{h}$ from the corresponding commanded value $h_c$, $\dot{h}_c$ and $\ddot{h}_c$ to produce error signals $h_\epsilon$, $\dot{h}_\epsilon$ and $\ddot{h}_\epsilon$, respectively; and
   aircraft control means for processing said error signals $h_\epsilon$, $\dot{h}_\epsilon$ and $\ddot{h}_\epsilon$ and control the aircraft to the command flight path.

2. The apparatus of claim 1 wherein the command means includes means for determining the altitude command signal $h_c$ as a predetermined function, $h_c = h(\Delta x)$, of said ground position signal and wherein the command means further includes means to determine the vertical velocity and vertical acceleration command signals according to the relationships:

$$\dot{h}_c = V_G(d/dx)h(\Delta x)$$

and $$\ddot{h}_c = V_G(d^2/dx^2)h(\Delta x) + (\dot{V}_G/V_G)\dot{h}_c.$$

3. The apparatus of claim 1 wherein the command means includes means for generating a signal corresponding to $d^2h(x)/dx^2$ where $h(x)$ is the altitude of the aircraft as a function of aircraft position x, the command means further comprising means to determine the vertical acceleration command according to the relationship:

$$\ddot{h}_c = V_G^2 \frac{d^2h(\Delta x)}{dx^2} + \frac{\dot{V}_G}{V_G} \dot{h}_c;$$

the command means further comprising means to determine the altitude and vertical velocity signals according to the relationships:

$$\dot{h}_c = \dot{h}_{ct=0} + \int_0^t \ddot{h}_c \, dt,$$

where $\dot{h}_{ct=0}$ is the desired vertical velocity rate at flare initiation and $$h_c = h_{ct=0} + \int_0^t \dot{h}_c \, dt,$$

where $h_{ct=0}$ is the altitude at flare initiation.

4. The apparatus of claim 1 wherein the command means includes means for determining the command signals according to the relationships:

$$h_c = (k_1/k_2^2)[e^{-k2x} - e^{-kRk2x/k_2^2}] + k_3x + k_4$$

$$\dot{h}_c = V_G(k_1/k_2)[e^{-k2x} + e^{-kRk2x/k_R}] + k_3$$

$$\ddot{h}_c = V_G^2 k_1[e^{-k2x} - e^{-kRk2x}] + (\dot{V}_G/V_G)\dot{h}_c$$

where the constants $k_1$-$k_4$ are selected in accordance with the constraints of the desired flare path and $k_R$ is selected to yield the desired acceleration rise time.

5. A method for generating aircraft flare path control signals comprising the steps of:
(a) producing a ground position signal, x, having a value representative of the position of the aircraft with respect to a predetermined ground location;
(b) producing a ground speed signal, $V_G$, having a value representative of the ground speed of the aircraft;
(c) producing an altitude command signal, $h_c$, a vertical velocity command signal, $\dot{h}_c$, and a vertical acceleration command signal, $\ddot{h}_c$, said $h_c$ signal being functionally related to said position signal x and said $\dot{h}_c$ and $\ddot{h}_c$ signals being functionally related to said position signal x as well as said ground speed signal $V_G$, said command signals $h_c$, $\dot{h}_c$ and $\ddot{h}_c$ defining the desired flare path of the aircraft;

(d) producing signals h, $\dot{h}$ and $\ddot{h}$ corresponding to aircraft actual altitude, vertical velocity and vertical acceleration, respectively;
(e) subtracting each actual aircraft signal h, $\dot{h}$ and $\ddot{h}$ from the corresponding commanded value $h_c$, $\dot{h}_c$ and $\ddot{h}_c$ and producing error signals $h_e$, $\dot{h}_e$ and $\ddot{h}_e$, respectively, in response thereto; and
(f) processing said error signals in a predetermined manner to control the aircraft to the commanded flare path.

6. The method of claim 5 wherein step (c) further comprises the steps of:
(i) producing said altitude command signal $h_c$ in accordance with a predetermined function $h_c = h(\Delta x)$;
(ii) producing said vertical velocity command signal $\dot{h}_c$ in accordance with a predetermined function $\dot{h}_c = V_G \, dh(\Delta x)/dx$; and
(iii) producing said vertical acceleration command signal $\ddot{h}_c$ in accordance with a predetermined function $$\ddot{h}_c = V_G^2 \frac{d^2h(\Delta x)}{dx^2} + \frac{\dot{V}_G}{V_G} \dot{h}_c.$$

7. The method of claim 5 wherein step (c) comprises the further steps of:
(i) producing a signal corresponding to $d^2h(\Delta x)/dx^2$ where $h(\Delta x)$ is the commanded altitude of the aircraft as a function of aircraft position;
(ii) producing said vertical acceleration command signal $\ddot{h}_c$ in accordance with a predetermined function $$\ddot{h}_c = V_G^2 \frac{d^2h(\Delta x)}{dx^2} + \frac{\dot{V}_G}{V_G} \dot{h}_c;$$

(iii) producing said vertical velocity command signal $\dot{h}_c$ in accordance with a predetermined function $$\dot{h}_c = \dot{h}_{ct=0} + \int_0^t \ddot{h}_c \, dt,$$

where
$\dot{h}_{ct=0}$ represents
the commanded vertical velocity rate at flare initiation; and
(iv) producing said altitude command signal $h_c$ in accordance with a predetermined function $$h_c = h_{ct=0} + \int_0^t \dot{h}_c \, dt,$$

where $h_{ct=0}$ is the altitude at command flare initiation.

8. The method of claim 5 wherein step (c) comprises the further steps of:
(i) producing said altitude command signal $h_c$ in accordance with a predetermined function $$h_c = k_1[e^{-k2x} - (e^{-kAk2x}/k_R^2)] + k_3x + k_4;$$

(ii) producing said vertical velocity command signal $\dot{h}_c$ in accordance with a predetermined function:

$$\dot{h}_c = V_G(k_1/k_2)[-e^{-k_2 x} + (e^{-k_R k_2 x}/k_R)] + k_3;$$

and (iii) producing said vertical acceleration command signal in accordance with a predetermined function;

$$\ddot{h}_c = V_G^2 k_1 [e^{-k_2 x} - e^{-k_R k_2 x}] + (\dot{V}_G/V_G)\dot{h}_c,$$

where the constants $k_1$–$k_4$ are selected in accordance with the constraints of the flare path and $k_R$ is selected to yield the desired acceleration rise time.

* * * * *